US008797159B2

(12) United States Patent
Kirkpatrick et al.

(10) Patent No.: US 8,797,159 B2
(45) Date of Patent: Aug. 5, 2014

(54) OCCUPANCY SENSOR WITH STORED OCCUPANCY SCHEDULE

(75) Inventors: Philip Kirkpatrick, Dumont, NJ (US); Russikesh Kumar, Ridgewood, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 322 days.

(21) Appl. No.: 13/113,649

(22) Filed: May 23, 2011

(65) Prior Publication Data
US 2012/0299728 A1    Nov. 29, 2012

(51) Int. Cl.
*G08B 13/00*    (2006.01)
(52) U.S. Cl.
USPC ........................................ 340/541; 340/573.4
(58) Field of Classification Search
CPC ............... H05B 37/0227; G05B 15/02; G05B 2219/2642; G01S 15/40; G01S 15/523
USPC ............ 340/6.1, 6.11, 541-567, 573.1, 573.4
See application file for complete search history.

(56) References Cited

U.S. PATENT DOCUMENTS

| | | | |
|---|---|---|---|
| 5,189,393 A | 2/1993 | Hu | |
| 5,216,333 A | 6/1993 | Nuckolls | |
| 5,406,173 A | 4/1995 | Mix | |
| 5,455,487 A | 10/1995 | Mix | |
| 5,598,042 A | 1/1997 | Mix | |
| 5,623,172 A | 4/1997 | Zaretsky | |
| 5,637,964 A | 6/1997 | Hakkarainen | |
| 5,699,243 A | 12/1997 | Eckel | |
| 5,726,900 A | 3/1998 | Walter | |
| 5,739,753 A | 4/1998 | Porter | |
| 5,764,146 A | 6/1998 | Baldwin | |
| 5,772,326 A | 6/1998 | Batko | |
| 5,774,322 A | 6/1998 | Walter | |
| 5,786,644 A | 7/1998 | Zaretsky | |
| 5,821,642 A | 10/1998 | Nishhira | |
| 5,848,054 A | 12/1998 | Mosebrook | |
| 5,905,442 A | 5/1999 | Mosebrook | |
| 5,927,844 A | 7/1999 | Justiniano | |
| 5,946,209 A | 8/1999 | Eckel | |
| 5,971,597 A | 10/1999 | Baldwin | |
| 5,973,594 A | 10/1999 | Baldwin | |
| 5,984,513 A | 11/1999 | Baldwin | |
| 5,986,357 A * | 11/1999 | Myron et al. | ................. 307/116 |
| 6,082,894 A | 7/2000 | Batko | |
| 6,114,816 A | 9/2000 | Nuckolls | |
| 6,126,296 A | 10/2000 | Justiniano | |
| 6,138,241 A | 10/2000 | Eckel | |
| 6,140,921 A * | 10/2000 | Baron et al. | ................. 340/540 |
| 6,151,529 A | 11/2000 | Batko | |
| 6,166,640 A | 12/2000 | Nishihira | |
| 6,222,191 B1 * | 4/2001 | Myron et al. | ................. 250/353 |

(Continued)

OTHER PUBLICATIONS

InHome Wireless Motion Sensor Installation Guide, installation guide, 2007, Card Access, Inc.

*Primary Examiner* — Hai Phan
*Assistant Examiner* — Orlando Bousono
(74) *Attorney, Agent, or Firm* — Crestron Electronics Inc.

(57) ABSTRACT

An occupancy sensor detects expected and unexpected occupancies in a monitored area with an expected occupancy schedule. The occupancy sensor includes a real time clock, a memory, a sensor element, a processor, indicator lights and a network interface. The occupancy sensor transmits an occupancy correction signal to a network if the actual occupancy of the monitored area does not match the expected occupancy state of the monitored area.

14 Claims, 7 Drawing Sheets

(56) References Cited

U.S. PATENT DOCUMENTS

| | | |
|---|---|---|
| 6,275,163 B1 | 8/2001 | Bogorad |
| 6,285,912 B1 | 9/2001 | Ellison |
| 6,289,404 B1 | 9/2001 | Bonasia |
| 6,307,331 B1 | 10/2001 | Bonasia |
| 6,307,354 B1 | 10/2001 | Nishihira |
| 6,324,008 B1 | 11/2001 | Baldwin |
| 6,348,686 B1 | 2/2002 | Howard |
| 6,385,732 B1 | 5/2002 | Eckel |
| 6,388,399 B1 | 5/2002 | Eckel |
| 6,466,826 B1 | 10/2002 | Nishihira |
| 6,472,853 B2 | 10/2002 | Nishihira |
| 6,479,823 B1 | 11/2002 | Strang |
| 6,617,560 B2 | 9/2003 | Forke |
| 6,697,757 B2 | 2/2004 | Eckel |
| 6,759,954 B1 | 7/2004 | Myron |
| 6,791,458 B2 | 9/2004 | Baldwin |
| 6,798,341 B1 | 9/2004 | Eckel |
| 6,803,728 B2 | 10/2004 | Balasubramaniam |
| 6,885,300 B1 | 4/2005 | Johnston |
| 6,888,323 B1 | 5/2005 | Null |
| 6,909,668 B2 | 6/2005 | Baldwin |
| 6,930,260 B2 | 8/2005 | Clegg |
| 6,933,486 B2 | 8/2005 | Pitigoi-Aron |
| 6,940,230 B2 | 9/2005 | Myron |
| 7,006,792 B2 | 2/2006 | Wilson |
| 7,027,355 B2 | 4/2006 | Baldwin |
| 7,027,770 B2 | 4/2006 | Judd |
| 7,092,772 B2 | 8/2006 | Murray |
| 7,106,261 B2 | 9/2006 | Nagel |
| 7,116,056 B2 | 10/2006 | Jacoby |
| 7,122,976 B1 | 10/2006 | Null |
| 7,126,291 B2 | 10/2006 | Kruse |
| 7,164,110 B2 | 1/2007 | Pitigoi-Aron |
| 7,190,126 B1 | 3/2007 | Paton |
| 7,211,798 B2 | 5/2007 | Wu |
| 7,274,117 B1 | 9/2007 | Viola |
| 7,277,012 B2 | 10/2007 | Johnston |
| 7,307,542 B1 | 12/2007 | Chandler |
| 7,358,927 B2 | 4/2008 | Luebke |
| 7,361,853 B2 | 4/2008 | Clegg |
| 7,362,285 B2 | 4/2008 | Webb |
| 7,369,060 B2 | 5/2008 | Veskovic |
| 7,391,297 B2 | 6/2008 | Cash |
| 7,394,451 B1 | 7/2008 | Patten |
| 7,405,524 B1 | 7/2008 | Null |
| 7,408,525 B2 | 8/2008 | Webb |
| 7,414,210 B2 | 8/2008 | Clegg |
| 7,432,690 B2 | 10/2008 | Williams |
| 7,436,132 B1 | 10/2008 | Null |
| 7,480,208 B2 | 1/2009 | Bender |
| 7,480,534 B2 | 1/2009 | Bray |
| 7,560,696 B2 | 7/2009 | Wu |
| 7,626,339 B2 | 12/2009 | Paton |
| 7,641,491 B2 | 1/2010 | Altonen |
| 7,747,357 B2 | 6/2010 | Murdoch |
| 7,791,282 B2 | 9/2010 | Yu |
| 7,800,049 B2 | 9/2010 | Bandringa |
| 7,800,498 B2 | 9/2010 | Leonard |
| 7,830,133 B2 | 11/2010 | Williams |
| 2002/0149492 A1* | 10/2002 | Buckingham et al. ...... 340/691.6 |
| 2007/0182554 A1* | 8/2007 | Elwell ............................ 340/567 |
| 2007/0182580 A1* | 8/2007 | Elwell ....................... 340/825.36 |
| 2007/0182581 A1* | 8/2007 | Elwell ....................... 340/825.36 |
| 2007/0216313 A1* | 9/2007 | Soccoli et al. ................. 315/149 |
| 2007/0233323 A1* | 10/2007 | Wiemeyer et al. ............ 700/276 |
| 2007/0285510 A1* | 12/2007 | Lipton et al. .................. 348/135 |
| 2008/0079569 A1* | 4/2008 | Axelsen ......................... 340/541 |
| 2008/0083234 A1* | 4/2008 | Krebs et al. ..................... 62/129 |
| 2008/0088435 A1 | 4/2008 | Cash |
| 2008/0224835 A1 | 9/2008 | Noest |
| 2008/0265799 A1* | 10/2008 | Sibert ........................... 315/292 |
| 2008/0273754 A1 | 11/2008 | Hick |
| 2009/0095889 A1 | 4/2009 | Bender |
| 2009/0174552 A1 | 7/2009 | Soccoli |
| 2009/0265280 A1* | 10/2009 | Taneja et al. .................... 705/80 |
| 2009/0273286 A1 | 11/2009 | Veskovic |
| 2009/0273296 A1 | 11/2009 | Veskovic |
| 2010/0052574 A1* | 3/2010 | Blakeley et al. .............. 315/307 |
| 2010/0052576 A1* | 3/2010 | Steiner et al. ................. 315/361 |
| 2010/0052894 A1 | 3/2010 | Steiner |
| 2010/0097226 A1 | 4/2010 | Parsons |
| 2010/0102962 A1 | 4/2010 | Hick |
| 2010/0176733 A1* | 7/2010 | King ............................. 315/158 |
| 2010/0188009 A1 | 7/2010 | Bull |
| 2010/0207759 A1 | 8/2010 | Sloan |
| 2010/0237711 A1 | 9/2010 | Parsons |
| 2010/0241245 A1* | 9/2010 | Wiemeyer et al. .............. 700/19 |
| 2010/0244709 A1 | 9/2010 | Steiner |
| 2010/0250547 A1* | 9/2010 | Grefenstette et al. ......... 707/740 |
| 2010/0270982 A1 | 10/2010 | Hausman |
| 2010/0277306 A1* | 11/2010 | Leinen et al. .............. 340/539.3 |
| 2010/0294915 A1 | 11/2010 | Williams |
| 2011/0157366 A1* | 6/2011 | Padmanabh et al. .......... 348/159 |
| 2011/0213588 A1* | 9/2011 | Lin et al. ....................... 702/181 |
| 2011/0307112 A1* | 12/2011 | Barrilleaux ................... 700/291 |
| 2012/0066168 A1* | 3/2012 | Fadell et al. .................... 706/52 |
| 2012/0086363 A1* | 4/2012 | Golding et al. ............... 315/312 |
| 2012/0139694 A1* | 6/2012 | Pineau et al. .................. 340/5.6 |
| 2012/0153868 A1* | 6/2012 | Gu et al. ....................... 315/307 |
| 2012/0242492 A1* | 9/2012 | Grunfeld ....................... 340/667 |
| 2012/0278640 A1* | 11/2012 | Caglianone ................... 713/323 |

\* cited by examiner

| SATURDAY MAY 21st 2011 ||
|---|---|
| Time Period | Expected Occupancy |
| 3:01-3:30 PM | Occupied |
| 3:31-4:00 PM | Occupied |
| 4:01-4:30 PM | Occupied |
| 4:31-5:00 PM | Occupied |
| 5:01-5:30 PM | Occupied |
| 5:31-6:00 PM | Occupied |
| 6:01-6:30 PM | Vacant |
| 6:31-7:00 PM | Vacant |
| 7:01-7:30 PM | Vacant |
| 7:31-8:00 PM | Vacant |
| 8:01-8:30 PM | Vacant |
| 8:31-9:00 PM | Vacant |
| 9:01-9:30 PM | Vacant |
| 9:31-10:00 PM | Vacant |
| 10:01-10:31 PM | Vacant |

| SATURDAY MAY 21st 2011 | | |
|---|---|---|
| Time Period | Expected Occupancy | Expected Occupants |
| 3:01-3:30 PM | Occupied | 15 |
| 3:31-4:00 PM | Occupied | 15 |
| 4:01-4:30 PM | Occupied | 15 |
| 4:31-5:00 PM | Occupied | 45 |
| 5:01-5:30 PM | Occupied | 45 |
| 5:31-6:00 PM | Occupied | 45 |
| 6:01-6:30 PM | Vacant | 0 |
| 6:31-7:00 PM | Vacant | 0 |
| 7:01-7:30 PM | Vacant | 0 |
| 7:31-8:00 PM | Vacant | 0 |
| 8:01-8:30 PM | Vacant | 0 |
| 8:31-9:00 PM | Vacant | 0 |
| 9:01-9:30 PM | Vacant | 0 |
| 9:31-10:00 PM | Vacant | 0 |
| 10:01-10:31 PM | Vacant | 0 |

OCCUPANCY SENSOR WITH STORED OCCUPANCY SCHEDULE

BACKGROUND OF THE INVENTION

1. Technical Field

The present invention relates to building automation and more specifically to occupancy sensors.

2. Background Art

Efficient and productive use of space and resources is increasingly becoming an important goal for businesses and organizations. Given current concerns about energy costs and public perception, this trend should continue for the foreseeable future. Occupancy sensors are a crucial component in realizing this goal.

Occupancy sensors are a common component in many buildings. Typically mounted on ceilings, occupancy sensors detect the presence of occupants within an area. They are most commonly used to control the power delivered to electrical loads, specifically lights, depending on the occupancy of the monitored area. For example, an occupancy sensor may be used to turn off a light in an office when occupancy hasn't been sensed for a period of time, thereby conserving electricity. Conversely, after a period of vacancy, the occupancy sensor may conveniently turn on the light upon sensing occupancy after a period of vacancy. Typically, a signal is transmitted to a switching device, such as a relay or a power pack, to control the load.

Although most commonly used to directly control a load, occupancy sensors are increasingly employed in Building Automation Systems (BAS). BASs, also known as Building Management Systems (BMS) and Energy Management Systems (EMS), are employed in buildings and structures to control and monitor a building's mechanical and electrical equipment. BASs are implemented in buildings in varying degrees of complexity and increase efficiency by exploiting relationships of interrelated components and sharing information to more accurately meet demand. In addition to controlling a load, occupancy sensors employed in BASs may also be networked to other components in the system to share information. Networked occupancy sensors may transmit and receive information to other network components such as other occupancy sensors and central controllers.

In another technical field, calendaring programs are employed in buildings to increase productive use of common areas. Common calendaring programs include Microsoft Outlook, Google Calendar, IBM Lotus Notes, CollegeNET R25 and Ungerboek Software International by EBMS. Generally, calendaring programs provide two core services, managing user's personal calendars and managing common area calendars, such as conference rooms and presentation spaces through networking. In addition, certain calendaring applications provide additional functions such as email notifications and collaborative scheduling.

Building designers and managers now desire an occupancy sensor which may leverage the information maintained by calendaring programs. Accordingly, there is a need for an improved occupancy sensor.

SUMMARY OF THE INVENTION

It is to be understood that both the general and detailed descriptions that follow are exemplary and explanatory only and are not restrictive of the invention.

DISCLOSURE OF INVENTION

Principles of the invention provide devices and methods for detecting expected and unexpected occupancies in a monitored area. For example, in the first aspect of the invention, an occupancy sensor for detecting expected and unexpected occupancies comprises a real time clock configured for providing the current time, a memory configured for storing an expected occupancy schedule, a sensor element configured for detecting the actual occupancy of the monitored area and a processor. The processor is configured for accepting signals from the sensor element and the real time clock, comparing the actual occupancy of the monitored area to the expected occupancy of the monitored area and generating a first signal and a second signal. The first signal provides the actual occupancy of the monitored area and the second signal provides whether the actual occupancy of the monitored area matches the expected occupancy.

In a second aspect, an occupancy sensor for detecting expected and unexpected occupancies comprises a real time clock, a memory, a sensor element, a processor, a power over Ethernet (PoE) interface and a first and second indicator lights. The real time clock provides the current time to the processor. The memory stores an expected occupancy schedule. The sensor element detects the actual occupancy of the monitored area. The processor is configured for accepting signals from the sensor element and the real time clock, comparing the actual occupancy of the monitored area to the expected occupancy of the monitored area and generating an occupancy correction signal when said actual occupancy does not match the expected occupancy. The PoE interface is configured for transmitting the occupancy correction signal to a network. The first indicator light is continuously active when the monitored area is expectedly occupied and is blinkingly active when the monitored area is unexpectedly occupied. The second indicator light is continuously active when the monitored area is expectedly vacant and is blinkingly active when the monitored area is unexpectedly vacant.

In a third aspect, a system for detecting expected and unexpected occupancies comprises an occupancy sensor and a touchpanel. The occupancy sensor comprises a real time clock configured for providing the current time, a memory configured for storing an expected occupancy schedule, a sensor element configured for detecting the actual occupancy of the monitored area and a processor. The processor is configured for accepting signals from the sensor element and the real time clock, comparing the actual occupancy of the monitored area to the expected occupancy of the monitored area and generating a first signal and a second signal. The first signal provides the actual occupancy of the monitored area and the second signal provides whether the actual occupancy of the monitored area matches the expected occupancy. The touchpanel comprises an occupancy sensor interface for electrically coupling to the occupancy sensor and receiving the first and second signal from the occupancy sensor, a button backlit according to the occupancy state of the monitored area and a network interface for communicating the occupancy state of the monitored area to a network.

The present invention seeks to overcome or at least ameliorate one or more of several problems, including but not limited to: monitoring occupancy of an area in comparison to an expected occupancy state of the monitored area.

BRIEF DESCRIPTION OF DRAWINGS

The accompanying figures further illustrate the present invention.

The components in the drawings are not necessarily drawn to scale, emphasis instead being placed upon clearly illustrat-

LIST OF REFERENCE NUMBERS FOR THE MAJOR ELEMENTS IN THE DRAWING

The following is a list of the major elements in the drawings in numerical order.

10 occupancy sensor
11 touchpanel
12 first signal
13 second signal
20 expected occupancy schedule
21 time period
22 expected occupancy
41 remote control
42 security guard
43 presence information
51 expected number of occupants
71 calendaring application
72 controller
73a A/V equipment
73b lighting controls
73c shade controls
73d HVAC controls
101 real time clock (p/o occupancy sensor 10)
102 memory (p/o occupancy sensor 10)
103 processor (p/o occupancy sensor 10)
104 sensor element (p/o occupancy sensor 10)
105 indicator light (p/o occupancy sensor 10)
106 network interface (p/o occupancy sensor 10)
107 wireless transceiver (p/o occupancy sensor 10)
111 buttons (p/o touchpanel 11)
113 occupancy sensor interface port (p/o touchpanel 11)
114 network interface port (p/o touchpanel 11)

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of the disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves an inventive occupancy sensor. More specifically, the present invention provides an occupancy sensor that detects expected and unexpected occupancy conditions based on an expected occupancy schedule. Further, the inventive occupancy sensor is configured for providing an occupancy correction signal to a network. Advantageously, the inventive occupancy sensor may increase both the security and efficiency of an area by monitoring for unexpected occupancies and vacancies.

Figure 1:
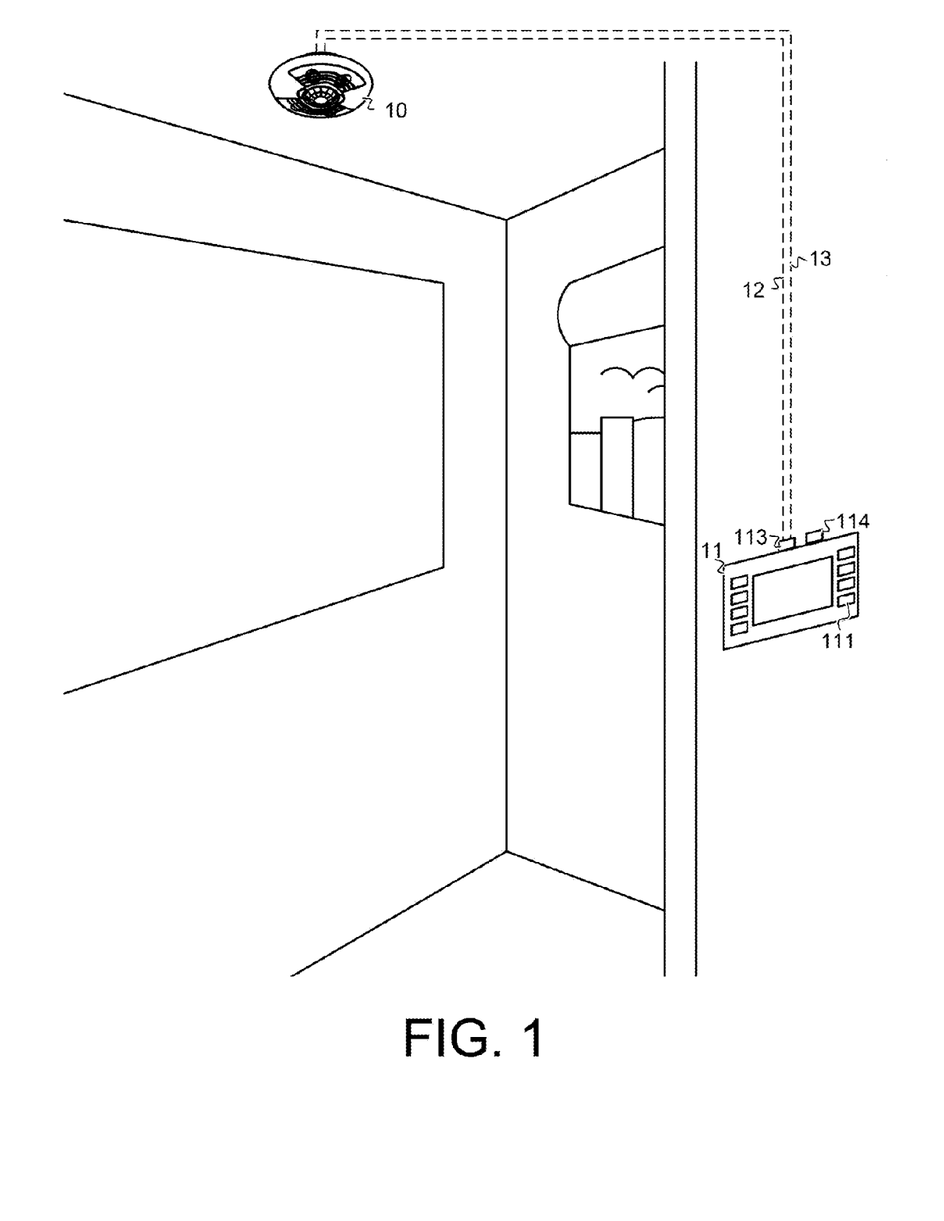
FIG. 1 shows an inventive occupancy sensor mounted in a conference room, according to an embodiment of the invention.

FIG. 1 shows the inventive occupancy sensor 10 mounted in a conference room, according to an embodiment of the invention. The occupancy sensor 10 is mounted on the ceiling of a monitored area, such as the conference room, either in a ceiling wall box or directly to a ceiling panel, such as with adhesives, fasteners or other attachment means. A touchpanel 11 is disposed on a wall outside of the conference room and is electrically coupled to the occupancy sensor 10 via an occupancy sensor interface port 113. The occupancy sensor interface port 113 comprises a four pin terminal block with two communication pins, a power pin and a ground pin.

The occupancy sensor 10 detects the actual occupancy of the conference room and compares it to an expected occupancy of the conference room provided in an expected occupancy schedule stored in the occupancy sensor 10. The expected occupancy schedule may be preprogrammed, uploaded from a remote source, or entered via a user interface.

Figure 2:
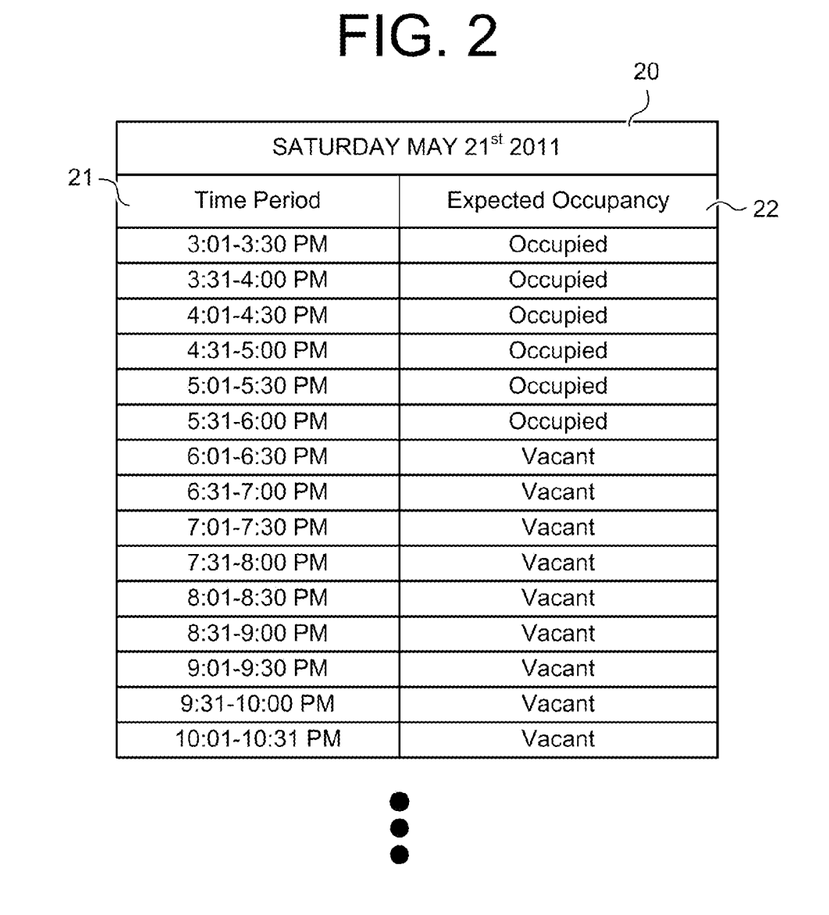
FIG. 2 is an illustrative expected occupancy schedule for the conference room monitored by the inventive occupancy sensor of FIG. 1.

FIG. 2 is an illustrative expected occupancy schedule for the conference room monitored by the inventive occupancy sensor 10 of FIG. 1. The expected occupancy schedule 20 lists the expected occupancy 22 of the conference room for corresponding time periods 21. For example, in this illustrative example, the expected occupancy of the conference room for the time period from 5:01 PM to 5:30 PM is occupied. The expected occupancy of the conference room for the time period from 6:01 PM to 6:30 PM. The expected occupancy schedule 20 may be generated by a calendaring program managing a meeting schedule for the conference room. For example, the touchpanel 11 may be running a calendaring application.

The occupancy sensor 10 generates a first signal 12 and a second signal 13 as a result of the comparison of the actual occupancy with the expected occupancy and transmits these signals to the occupancy sensor 10 via the occupancy sensor interface port 113. The first signal 12 indicates whether the actual occupancy is occupied or vacant. The second signal 13 indicates whether the actual occupancy is matches or doesn't match the expected occupancy. Together the first signal 12 and the second signal 13 together give the occupancy state of the monitored area. Accordingly, there are four possible occupancy states of the conference room: expectedly occupied, unexpectedly occupied, expectedly vacant, and unexpectedly vacant.

The occupancy state of the monitored area is shown by indicator lights activated according to the occupancy state of the monitored area. In the embodiment shown in FIG. 1, the indicator lights are green and red LED backlights for touchpanel buttons 111. The touchpanel buttons 111 are backlit green if the conference room is vacant and red if the conference room is occupied. Additionally, the touchpanel buttons 111 are backlit continuously if the actual occupancy matches the expected occupancy and blink if the actual occupancy does not match the expected occupancy.

In a further embodiment, the indicator lights comprise a yellow backlight as well. In this embodiment, the buttons 111 are backlit solely green if the conference room is expectedly vacant and solely red if the conference room is unexpectedly vacant. If the conference room is unexpectedly vacant, alternating touchpanel buttons 111 are backlit yellow and green. If the conference room is unexpectedly occupied, alternating touchpanel buttons 111 are backlit in yellow and red.

Advantageously, a passerby, such as a security guard, can ascertain the occupancy state of the conference room with a glance at the touchpanel 11 mounted outside of the conference room. For example, a security guard may be alerted to an unexpectedly occupied conference room by flashing red buttons outside of the conference room.

In a further embodiment of the invention, a network interface 114 of the touchpanel 11 may transmit an occupancy correction signal to a network. The occupancy correction signal corresponds to the first signal 12 and the second signal 13 generated by the occupancy sensor 10. The occupancy correction signal may be transmitted only when the occupancy state of the monitored area is unexpectedly occupied or unexpectedly vacant. For example, the occupancy correction signal may be a binary signal indicating either expected or unexpected. Alternatively, the occupancy correction signal may be a digital signal encoded with one of the four possible occupancy states of the monitored area as well as other information such as a network address.

In the above embodiment, the indicator lights and the network interface 114 are external to the occupancy sensor 10 and are described as being part of a touchpanel 11 electrically coupled to the occupancy sensor 10. However, in other embodiments of the occupancy sensor 10, the indicator lights and network interface are components of the occupancy sensor 10.

Figure 3:
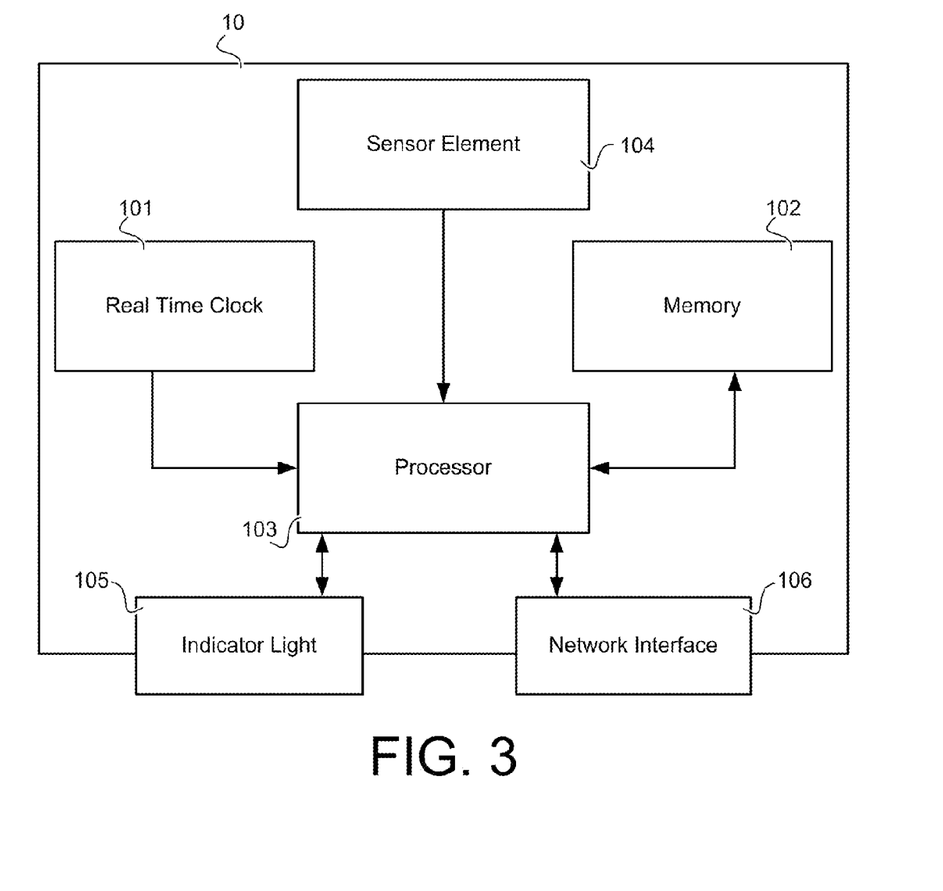
FIG. 3 is an illustrative block diagram of the inventive occupancy sensor according to an embodiment of the invention.

FIG. 3 is an illustrative block diagram of the inventive occupancy sensor 10 according to an embodiment of the invention. The occupancy sensor 10 comprises a real time clock 101, a memory 102, a processor 103, a sensor element 104, indicator lights 105, and a network interface 106.

The memory 102 stores information accessible by the processor 103, including instructions for execution by the processor 103 and data which is retrieved, manipulated or stored by the processor 103. The memory 102 may be of any type capable of storing information accessible by the processor 103, such as a hard drive, ROM, RAM, write capable, read only, or the like. The instructions may comprise any set of instructions to be executed directly (such as machine code) or indirectly (such as scripts) by the processor 103.

Specifically, the memory 102 stores the expected occupancy schedule 20 for the monitored area. As described above in reference to FIG. 2, the expected occupancy schedule 20 lists expected occupancy 22 of the monitored area for corresponding time periods 21.

The sensor element 104 detects the actual occupancy of the monitored area. In an illustrative embodiment of the occupancy sensor 10, the sensor element 104 comprises a passive infrared (PIR) receiver, an ultrasonic transducer, and an audio microphone. The actual occupancy of the monitored area is determined collectively from the three sensor technologies according to individual settings of each sensor technology as well as combinational logic.

Users may desire to change the sensitivity of the occupancy sensor 10 to account for environment or according to personal preference. It will be appreciated that the sensitivity of the occupancy sensor 10 may be adjusted by either adjusting individual sensor technology settings, such as threshold values, or by adjusting the combinational logic rules. For example, the sensor element 104 may determine the monitored area is occupied if all three sensor technologies sense occupancy. Alternatively, if more sensitivity is preferred, the sensor element 104 may determine the monitored area is occupied if any of the three occupancy sensor technologies sense occupancy. Additionally, a sensor technology may be weighted more or less heavily than the others or not at all. For example, in noisy environments, the audio microphone may have little to no effect on the determination of the actual occupancy.

The processor 103 is configured to compare the actual occupancy of the monitored area as determined by sensor element 104 to the expected occupancy of the monitored area listed in the expected occupancy schedule 20. The processor 103 generates the first signal 12 and the second signal 13 according to the comparison of the actual occupancy with the expected occupancy. The first signal 12 indicates the actual occupancy of the monitored area. The second signal 13 indicates whether the actual occupancy matches the expected occupancy. Together the first signal 12 and the second signal 13 together give the occupancy state of the monitored area. There are four possible occupancy states of the monitored area: expectedly occupied, unexpectedly occupied, expectedly vacant, and unexpectedly vacant.

The occupancy sensor 10 further comprises one or more indicator lights 105 configured to be activated according to the first signal 12 and second signal 13. The indicator lights 105 may be disposed on the surface of the occupancy sensor 10 or they may be external to the housing of the occupancy sensor 10 for placement external to the occupancy sensor 10. In a further embodiment of the invention, the occupancy sensor 10 comprises a first indicator light and a second indicator light. The first indicator light is active when the occupancy state of the monitored area is expectedly occupied. The second indicator light is active when the occupancy state of the monitored area is unexpectedly occupied. Alternatively, the first indicator light may be continuously active when the occupancy state of the monitored area is expectedly occupied and blinkingly active when the occupancy state is unexpectedly occupied. The first indicator light may be continuously active when the occupancy state of the monitored area is expectedly vacant and blinkingly active when the occupancy state is unexpectedly vacant.

The network interface 106 is configured for communicating on a network. The network interface 106 may be external to the housing of the occupancy sensor 10, such as in a touchpanel 11. Alternatively, the network interface 106 may be contained within the housing of the occupancy sensor 10 or may be an external component of the occupancy sensor 10. In a further embodiment of the invention, the network interface 106 is a power over Ethernet (PoE) interface for receiving electric power as well as for sending and receiving signals over an Internet Protocol (IP) based network. In yet another embodiment, the network interface 106 is a wireless radio frequency (RF) transceiver. The network may include any number of local or wide area networks including the Internet.

The network interface 106 is configured to receive information from the network, such as the expected occupancy schedule 20 as well as sensor settings. The network interface 106 is configured to transmit information to the network. Specifically, the network interface 106 is configured to transmit an occupancy correction signal generated by the processor 103. The occupancy correction signal may be transmitted only when the occupancy state of the monitored area is unexpectedly occupied or unexpectedly vacant. For example, the occupancy correction signal may be a binary signal indicating either expected or unexpected. Advantageously, by only transmitting a signal when the expected occupancy state does not match the predicted occupancy state, occupancy sensor power as well as network bandwidth may be conserved. Alternatively, the occupancy correction signal may be a digital signal encoded with one of the four possible occupancy states of the monitored area as well as other information such as a network address.

Figure 4:
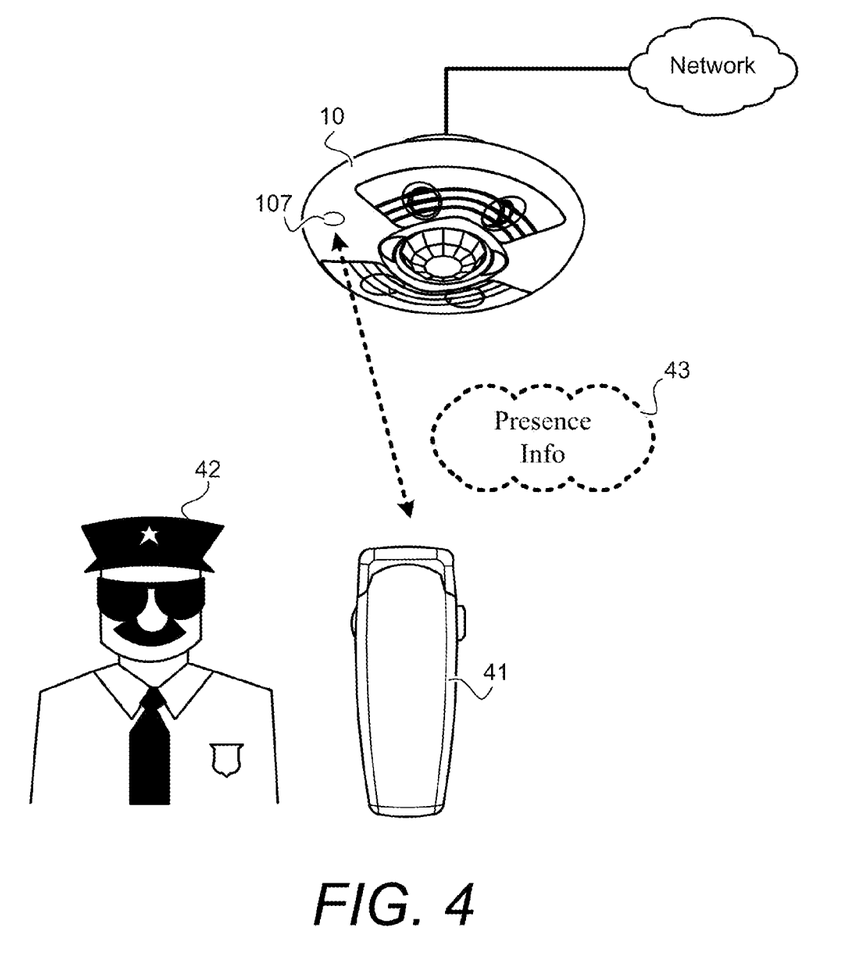
FIG. 4 is an illustrative diagram showing the inventive occupancy sensor communicating wirelessly with a remote control, according to an embodiment of the invention.

FIG. 4 is an illustrative diagram showing the inventive occupancy sensor 10 in communicating wirelessly with a remote control 41, according to an embodiment of the invention. In this embodiment, the occupancy sensor 10 further comprises a wireless transceiver 107, such as an IR transceiver, distinct from the network interface 106 and configured for bi-directional wireless communication with the remote control 41. The remote control 41 may be a touchpanel, a smart phone, a tablet computer or any other similar known device capable of communicating wirelessly with the occupancy sensor 10.

Advantageously, the occupancy sensor 10 is configured to receive presence information 43 from the remote control 41. Presence information 43 is information that indicates a user is physically present in the monitored area and may comprise an identification (ID) number or a security code. For example, the remote control 41 may function as an ID badge and the occupancy sensor 10 may receive an ID number indicating that that user is present in the monitored area. Advantageously a user may check into a meeting using the remote control 41 and the occupancy sensor 10.

In another example, a security guard 42 may employ a remote control 41 to alert the occupancy sensor 10 when he checks the monitored area. The remote control 41 may transmit an override signal to the occupancy sensor 10 so that it does not transmit that there is an unexpected occupancy to the network.

The occupancy sensor 10 may receive sensor element settings or other information from the remote control 41 and report back its current settings to the remote control 41. Additionally, in this embodiment, the occupancy sensor 10 may also transmit information received from the remote control 41, thereby acting as a gateway to the network.

Figure 5:
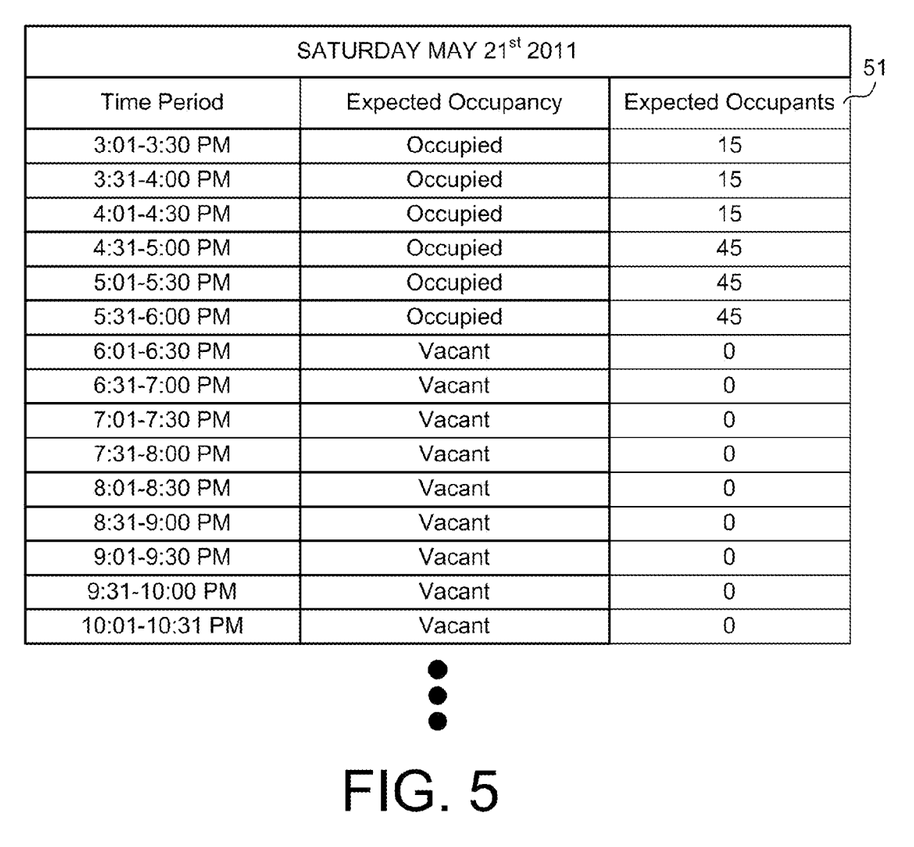
FIG. 5 is an illustrative expected occupancy schedule for the conference room further comprising an expected number of occupants.

FIG. 5 is an illustrative expected occupancy schedule for the conference room further comprising an expected number of occupants. In an embodiment of the invention, the occupancy sensor 10 is configured for determining the actual number of occupants in the monitored area. For example, the wireless interface may receive ID signals from occupants or the sensor element 104 may be an image sensor. In this embodiment the expected occupancy schedule 20 further comprises an expected number of occupants 51 for corresponding time periods. The processor 103 compares the actual number of occupants with the expected number of occupants 51 and generates an occupancy correction signal comprising a difference between the two.

In another embodiment of the invention, the occupancy sensor 10 further comprises a load control device. The load control device operably switches power to a load based on the actual occupancy of the monitored area. Preferably, the load control device is a dimming triac with associated control circuitry. When the actual occupancy of the monitored area transitions from occupied to vacant, as determined by the occupancy sensor 10, the load switching device fades the light from its current level to a predefined dim level in a predefined fade time. When the actual occupancy of the monitored area transitions from vacant to occupied, as determined by the occupancy sensor 10, the load switching device raises the light from its current level to a predefined occupied level in a predefined raise time.

Figure 6:
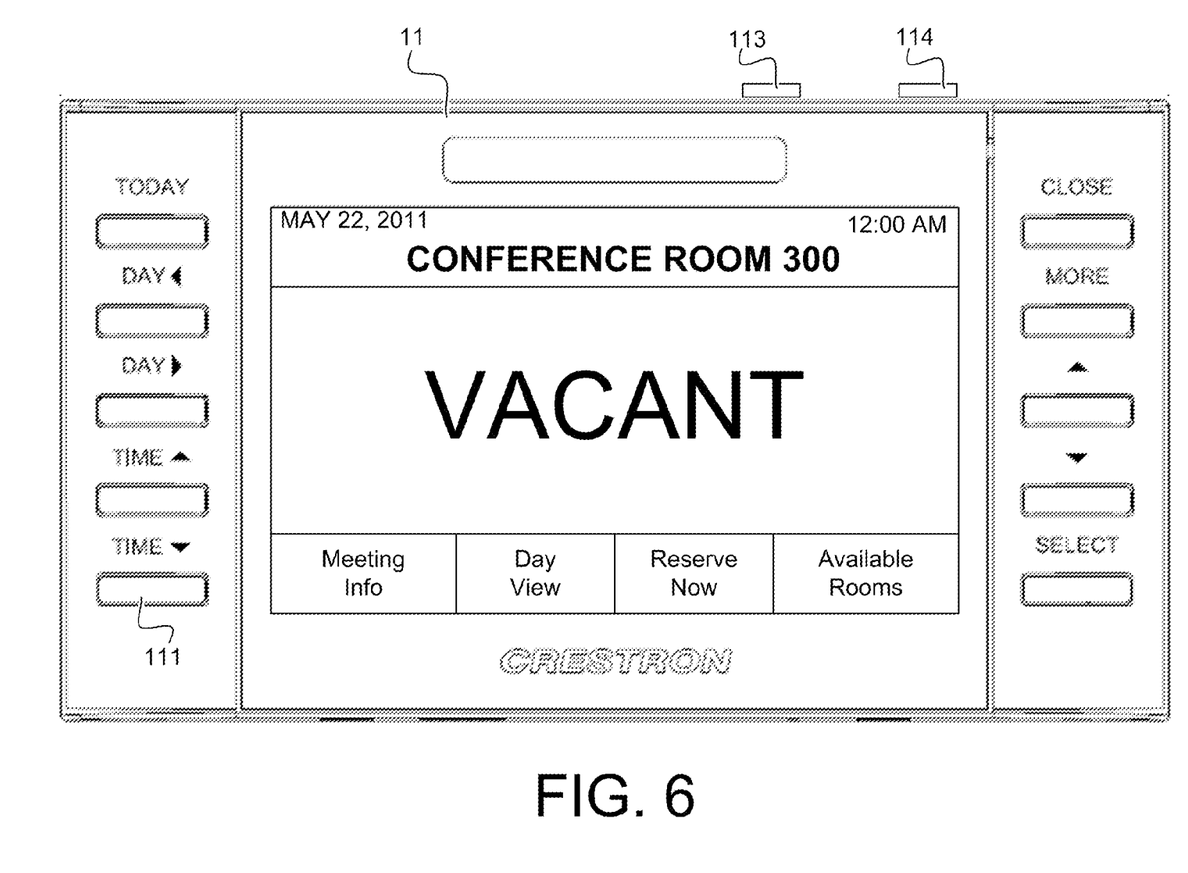
FIG. 6 shows a touchpanel displaying a graphic user interface of a calendaring application suitable for use with the inventive occupancy sensor.

FIG. 6 shows a touchpanel 11 displaying a graphic user interface of a calendaring application suitable for use with the inventive occupancy sensor 10. In this embodiment of the invention, the expected occupancy schedule 20 is generated by a calendaring application. The calendaring application is application software for managing a meeting schedule for one or more areas, including the monitored area. The calendaring application allows users to view the meeting schedule for the monitored area and schedule meetings in the monitored area through a series of menus, which together make up the graphic user interface (GUI) of the calendaring application.

In this embodiment, the calendaring application generates the expected occupancy schedule 20 corresponding to the meeting schedule for the monitored area. The touchpanel 11 may transmit the meeting schedule to the occupancy sensor 10 periodically such as daily or hourly or upon a triggering event such as when the meeting schedule 20 is updated with the calendaring application.

The calendaring application receives the expected occupancy state of the monitored area from the occupancy sensor 10 either directly from the occupancy sensor 10 as the first and second signal 13 or over the network as the occupancy correction signal. Advantageously, this allows the calendaring application to update the meeting schedule for the monitored area. An updated meeting schedule provides users with a current and accurate schedule and alerts users of vacant areas that were previously unavailable. Additionally, the calendaring application may make intelligent decisions based on the occupancy state of the monitored area. Finally, the correction signal and the updated schedule provide more accurate usage statistics for monitoring and reporting.

An intelligent decision is an action taken by the calendaring application based on an occupancy correction signal and meeting schedules managed by the calendaring application. An intelligent decision may include changing the time or location of a meeting, cancelling a meeting or sending a notification.

In response to the monitored area being unexpectedly vacant for a length of time, the calendaring application may make an intelligent decision to delete the scheduled meeting from the meeting schedule and make the area available to other users for reservation. Similarly, in response to the monitored area being unexpectedly occupied following a meeting, the calendaring application may make an intelligent decision to extend the meeting in increments of thirty minutes.

In another example, the calendaring application may make an intelligent decision to edit a recurring meeting based on occupancy correction signals from an occupancy sensor 10. If a recurring meeting is routinely missed or routinely start or ends late, the calendaring application may make an intelligent decision to cancel subsequent recurrences or adjust the start or end time of subsequent occurrences. Similarly, the calendaring application may make an intelligent decision to prevent a user from scheduling a meeting if that user routinely schedules meetings that go unattended. In a further embodiment of the invention in which the calendaring application resolves scheduling conflicts based on a priority system, a user that routinely schedules unattended meetings may be assigned a low priority number.

By providing the calendaring application with occupancy correction signals, the calendaring application can also maintain more accurate historical data to improve performance and spot trends. The occupancy correction signal can also reveal trends by showing comparison between actual occupancy and predicted occupancy. The calendaring application may generate usage reports based on actual occupancy as opposed to predicted occupancy.

Figure 7:
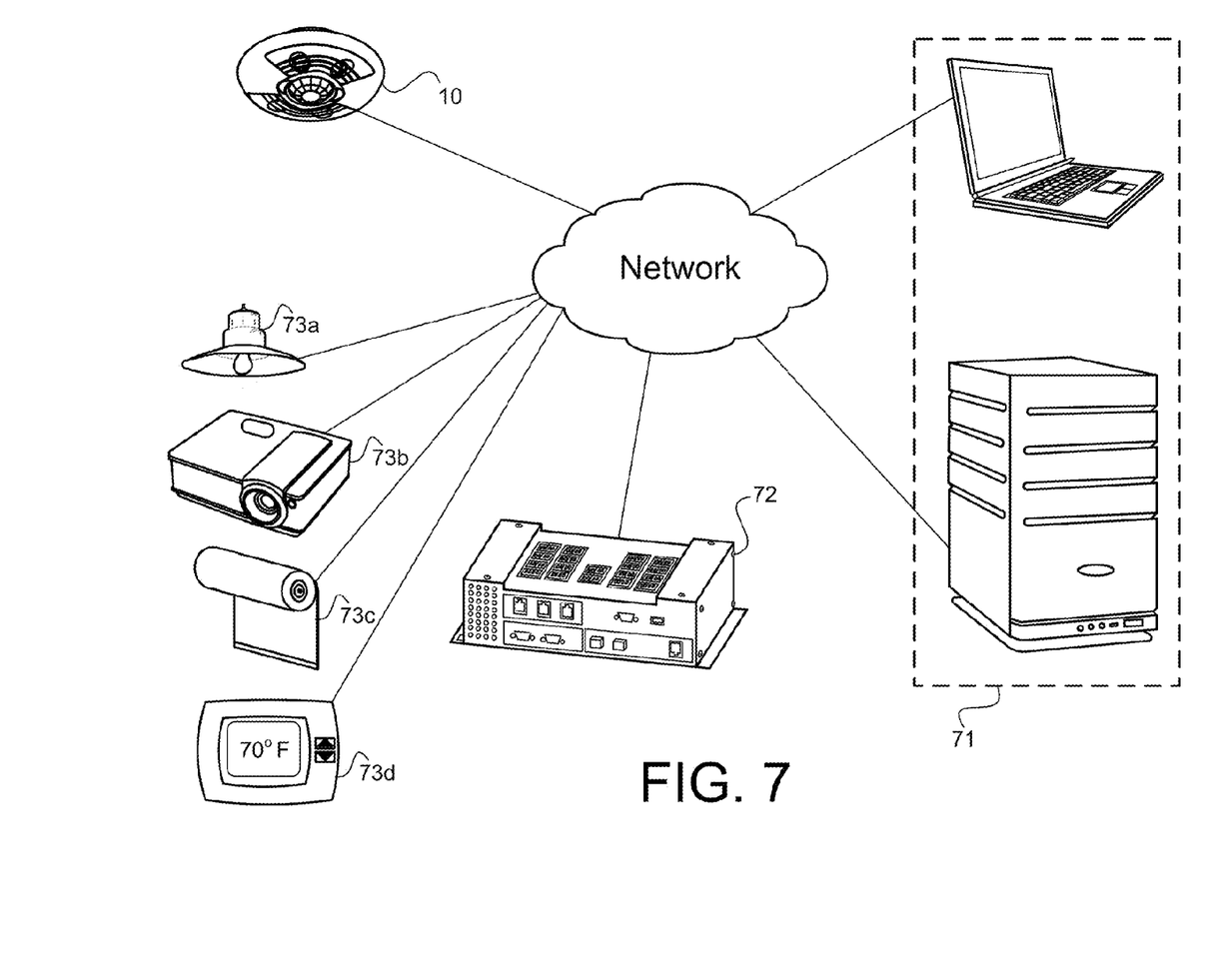
FIG. 7 is a diagram of a network including the inventive occupancy sensor, a calendaring application and a building automation system.

FIG. 7 is a diagram of a network including the inventive occupancy sensor 10, a calendaring application and a building automation system (BAS). The BAS comprises a controller 72 and various electrical devices 73 controlled by the controller 72. The various electrical devices may comprise A/V equipment 73a, lighting devices 73b, shade controls 73c and HVAC controls 73d. For example, the occupancy sensor 10 may be mounted on the ceiling of a conference room containing the controller 72 and the various electrical devices 73. The calendaring application 71 is an application program stored on a server and accessed by a client. In this embodiment, a user may preset certain ambient conditions of the room during a scheduled meeting with the calendaring application 71. For example, a menu on the GUI of the calendaring application may allow the user to precool the room to a certain temperature and activate a projector.

The calendaring application 71 communicates these settings to the controller 72 over the network and the controller 72 controls the electrical devices 73 accordingly. Advantageously, in this embodiment, the calendaring application 71 and the BAS interface to leverage the information provided by the occupancy correction signal. The calendaring application 71 may make intelligent decisions regarding scheduling and room control based on the occupancy correction signal transmitted by the occupancy sensor 10. For example, the calendaring application may make an intelligent decision to not cool the room for a meeting until occupancy is detected in the area if the user frequently schedules unattended meetings.

INDUSTRIAL APPLICABILITY

To solve the aforementioned problems, the present invention is a unique device in which an occupancy sensor 10 compares the occupancy of an area with an expected occupancy schedule.

LIST OF ACRONYMS USED IN THE DETAILED DESCRIPTION OF THE INVENTION

The following is a list of the acronyms used in the specification in alphabetical order.
AV Audio Visual
BAS building automation system
BMS building management system
EMS energy management system
GUI graphic user interface
HVAC heating, ventilation and air conditioning
ID identification
IP Internet Protocol
IR infrared
LED light emitting diode
PIR passive infrared
PoE power over Ethernet

ALTERNATE EMBODIMENTS

Alternate embodiments may be devised without departing from the spirit or the scope of the invention. For example, the occupancy sensor may comprise an RFID tag reader to determine the actual occupancy of the monitored area.

What is claimed is:

1. An occupancy sensor configured for detecting expected and unexpected occupancies within a monitored area, said occupancy sensor comprising:
   (a) a real time clock configured for providing the current time;
   (b) a memory configured for storing an expected occupancy schedule;
   (c) a sensor element configured for detecting the actual occupancy of the monitored area;
   (d) a first dedicated physical indicator light configured for being continuously active when the monitored area is expectedly occupied according to the expected occupancy schedule and being blinkingly active when the monitored area is unexpectedly occupied according to the expected occupancy schedule;
   (e) a second dedicated physical indicator light configured for being continuously active when the monitored area is expectedly vacant according to the expected occupancy schedule and being blinkingly active when the occupancy of the monitored area is unexpectedly vacant according to the expected occupancy schedule; and
   (f) a processor configured for:
      (i) accepting signals from the sensor element and the real time clock,
      (ii) comparing the actual occupancy of the monitored area to the expected occupancy of the monitored area, and
      (iii) generating a first signal and a second signal wherein said first signal provides the actual occupancy of the monitored area and the second signal provides whether said actual occupancy matches the expected occupancy.

2. The occupancy sensor of claim 1 further comprising a network interface configured for communicating on a network.

3. The occupancy sensor of claim 2 wherein the expected occupancy schedule is received from the network.

4. The occupancy sensor of claim 2 wherein the occupancy sensor is configured for transmitting an occupancy correction signal to the network.

5. The occupancy sensor of claim 4 wherein the occupancy sensor transmits the occupancy correction signal when the actual occupancy of the monitored area does not match the expected occupancy of the monitored area according to the expected occupancy schedule.

6. The occupancy sensor of claim 4 wherein the occupancy correction signal is a digital signal corresponding to an occupancy state of the monitored area.

7. The occupancy sensor of claim 2 wherein the network interface is a Power over Ethernet (PoE) interface.

8. The occupancy sensor of claim 2 further comprising an infrared (IR) transceiver configured for communicating with a remote control, wherein said occupancy sensor is further configured for passing information received from said remote control to the network via the network interface.

9. The occupancy sensor of claim 1 further comprising an infrared (IR) interface configured for bidirectional communication with a remote control and wherein:
   (a) the IR interface is configured for receiving a security override code from the remote control; and (b) the processor is configured for outputting the second signal corresponding to the actual occupancy matching the expected occupancy in response to the IR interface receiving the security override code.

10. The occupancy sensor of claim 1 wherein the first signal is a binary signal with a first state corresponding to occupied and a second state corresponding to vacant and the second signal is a binary signal with a first state corresponding to expected and a second state corresponding to unexpected.

11. The occupancy sensor of claim 6 wherein the occupancy correction signal is a binary signal with a first state corresponding to expected and a second state corresponding to unexpected.

12. The occupancy sensor of claim 1 wherein the first dedicated physical indicator light and the second dedicated physical indicator light are mounted external to the monitored area.

13. The occupancy sensor of claim 1 wherein the first dedicated physical indicator light and the second dedicated physical indicator light are disposed on a surface of the occupancy sensor.

14. An occupancy sensor configured for detecting expected and unexpected occupancies within a monitored area, said occupancy sensor comprising:
  (a) a real time clock configured for providing the current time;
  (b) a memory configured for storing an expected occupancy schedule;
  (c) a sensor element configured for detecting the actual occupancy of the monitored area;
  (d) a processor configured for:
    (i) accepting signals from the sensor element and the real time clock,
    (ii) comparing the actual occupancy of the monitored area to the expected occupancy of the monitored area, and
    (iii) generating an occupancy correction signal;
  (e) a first dedicated physical indicator light, said first dedicated physical indicator light being continuously active when the monitored area is expectedly occupied according to the expected occupancy schedule and being blinkingly active when the monitored area is unexpectedly occupied according to the expected occupancy schedule; and
  (f) a second dedicated physical indicator light, said second dedicated physical indicator light being continuously active when the monitored area is expectedly vacant according to the expected occupancy schedule and being blinkingly active when the occupancy of the monitored area is unexpectedly vacant according to the expected occupancy schedule; and
  (g) further comprising an infrared (IR) interface configured for bidirectional communication with a remote control and wherein the IR interface is configured for receiving a security override code from the remote and the processor is configured for outputting an occupancy correction signal indicating the monitored area is expectedly vacant in response to the IR interface receiving the security override code.

\* \* \* \* \*